United States Patent
Matsuki et al.

(10) Patent No.: US 11,434,835 B2
(45) Date of Patent: Sep. 6, 2022

(54) VALVE TIMING CONTROLLER

(71) Applicant: AISIN CORPORATION, Kariya (JP)

(72) Inventors: Ibuki Matsuki, Kariya (JP); Atsushi Yamamoto, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/206,402

(22) Filed: Mar. 19, 2021

(65) Prior Publication Data
US 2021/0310423 A1 Oct. 7, 2021

(30) Foreign Application Priority Data
Apr. 6, 2020 (JP) .............................. JP2020-068403

(51) Int. Cl.
| | |
|---|---|
| F02D 13/02 | (2006.01) |
| F02D 41/04 | (2006.01) |
| F01L 1/344 | (2006.01) |
| F01L 9/22 | (2021.01) |
| F01L 9/40 | (2021.01) |

(52) U.S. Cl.
CPC .......... *F02D 13/0238* (2013.01); *F01L 1/344* (2013.01); *F01L 9/22* (2021.01); *F01L 9/40* (2021.01); *F02D 41/042* (2013.01); *F01L 2009/4094* (2021.01); *F01L 2800/03* (2013.01); *F01L 2820/032* (2013.01); *F02D 2200/501* (2013.01)

(58) Field of Classification Search
CPC ............. F02D 13/0219; F02D 13/0238; F02D 41/042; F02N 19/004
See application file for complete search history.

(56) References Cited

U.S. PATENT DOCUMENTS

| | | | | |
|---|---|---|---|---|
| 5,048,480 A | * | 9/1991 | Price ..................... | F01L 13/065 |
| | | | | 123/321 |
| 6,311,654 B1 | * | 11/2001 | Ushida .................... | F01L 1/344 |
| | | | | 123/90.34 |

(Continued)

FOREIGN PATENT DOCUMENTS

| | | | | |
|---|---|---|---|---|
| DE | 102013004972 A1 | * | 9/2013 | ............... F01L 1/34 |
| DE | 102020109268 A1 | * | 10/2020 | |

(Continued)

*Primary Examiner* — Phutthiwat Wongwian
*Assistant Examiner* — Anthony L Bacon
(74) *Attorney, Agent, or Firm* — Buchanan Ingersoll & Rooney PC

(57) ABSTRACT

A valve timing controller includes: a driving-side rotation member rotatable around a rotation axis and rotating in synchronization with a crankshaft of an internal combustion engine; a driven-side rotation member rotatable around the rotation axis and rotating integrally with a camshaft of the engine; a phase regulating mechanism setting a relative rotation phase of the driving-side and driven-side rotation members by an electric motor; a detection unit detecting the relative rotation phase; a stop control portion displacing the relative rotation phase by controlling the electric motor to stop the engine after the relative rotation phase reaches a stop phase; and a correction control portion displacing the relative rotation phase in a direction closer to the stop phase by controlling the electric motor, when the relative rotation phase is displaced beyond a set amount from the stop phase, in a state where the engine is stopped by the stop control portion.

3 Claims, 7 Drawing Sheets

(56) References Cited

U.S. PATENT DOCUMENTS

| | | | |
|---|---|---|---|
| 2005/0257762 A1* | 11/2005 | Sawada | F01L 1/3442 123/90.17 |
| 2006/0102125 A1* | 5/2006 | Mashiki | F01L 9/20 123/90.15 |
| 2006/0272608 A1* | 12/2006 | Hara | F02N 19/004 123/182.1 |
| 2007/0200523 A1 | 8/2007 | Sasaki et al. | |
| 2011/0100312 A1* | 5/2011 | Hirata | F01L 1/022 123/90.17 |
| 2012/0174883 A1* | 7/2012 | Kokubo | F01L 1/352 123/90.15 |
| 2013/0247853 A1* | 9/2013 | Mikawa | F02D 13/0238 123/90.15 |
| 2013/0268179 A1* | 10/2013 | Wang | F01L 1/352 123/90.17 |
| 2014/0069360 A1* | 3/2014 | Kobayashi | F02D 13/0238 123/90.15 |
| 2014/0076251 A1* | 3/2014 | Matsuo | F02D 41/062 123/90.15 |
| 2014/0076253 A1* | 3/2014 | Kokubo | F01L 1/047 123/90.17 |

FOREIGN PATENT DOCUMENTS

| | | | | |
|---|---|---|---|---|
| JP | 2007228768 A | 9/2007 | | |
| JP | 2010084587 A | 4/2010 | | |
| JP | 2019127887 A | 8/2019 | | |
| WO | WO-2014130276 A2 * | 8/2014 | | F01L 1/34409 |

\* cited by examiner

VALVE TIMING CONTROLLER

CROSS REFERENCE TO RELATED APPLICATIONS

This application is based on and claims priority under 35 U.S.C. § 119 to Japanese Patent Application 2020-068403, filed on Apr. 6, 2020, the entire content of which is incorporated herein by reference.

TECHNICAL FIELD

This disclosure relates to a valve timing controller that sets an opening/closing timing of a valve of an internal combustion engine by a driving force of an electric motor.

BACKGROUND DISCUSSION

In the related art, a valve timing controller capable of changing an opening/closing timing of an intake valve or an exhaust valve in accordance with an operation situation of an internal combustion engine (hereinafter, also referred to as an "engine") has been practically used. For example, the valve timing controller has a mechanism for changing the opening/closing timing of the intake valve or the exhaust valve by changing a relative rotation phase of a driven-side rotation member (hereinafter, also simply referred to as a "relative rotation phase") with respect to rotation of a driving-side rotation member which is caused by an operation of the engine. In addition, in recent years, idling stop control for temporarily stopping the engine when a vehicle is stopped by stepping on a brake pedal during normal operation has been practically used. In the control, when the engine is stopped, the operation is changed to the relative rotation phase which facilitates restarting of the engine in a high temperature state. As a technique relating to the control, JP 2010-84587A (Reference 1) and JP 2019-127887A (Reference 2) below disclose the following techniques.

Reference 1 discloses a configuration in which an intake type valve timing controller (intake VVT in Reference 1) is controlled to a retarding side when the internal combustion engine provided in the vehicle is automatically stopped.

That is, when an engine automatic stop condition is satisfied in an idling operation state of the internal combustion engine, the valve timing controller is automatically controlled to the retarding side, and the internal combustion engine is automatically controlled to be stopped. According to the control performed in this way, Reference 1 enables quick starting by reducing an effective compression ratio of the internal combustion engine when starting the internal combustion engine.

In addition, Reference 2 discloses a configuration as follows. When performing a driving stop process of the internal combustion engine (engine in Reference 2) provided in the vehicle, the valve timing controller maintains the opening/closing timing (timing) at which the relative rotation phase of the valve timing controller (variable valve timing mechanism in Reference 2) advances from a most retarding phase. The opening/closing timing of the valve timing controller is set to the most retarding phase after the driving stop process of the engine is completed. According to the control performed in this way, Reference 2 enables satisfactory starting of the internal combustion engine.

In the vehicle including the internal combustion engine, automatic stop control is performed as follows. The internal combustion engine is automatically stopped when a vehicle speed is lowered due to a deceleration operation, for example, such as a driver's stepping on the brake pedal so that fuel consumption is suppressed during idling.

It is also conceivable to perform automatic start control as follows. After the internal combustion engine is stopped by the above-described automatic stop control, for example, when the driver releases an operation of the brake pedal and steps on an accelerator pedal, the internal combustion engine is started by driving a starter motor.

For this reason, in Reference 1, in order to quickly start the internal combustion engine, control for setting the valve timing controller of an intake camshaft to the most retarding phase is performed when the internal combustion engine is automatically stopped.

Here, in view of the intake VVT disclosed in Reference 1 in which the opening/closing timing is set by driving an electric motor, after the internal combustion engine is stopped, a pressure is applied inside a cylinder, a rotational force is applied in a direction in which weights of a plurality of pistons are balanced in a plurality of cylinders, or a biasing force of a valve spring that applies the biasing force in a closing direction of the intake valve is applied to a cam surface. For this reason, the opening/closing timing of the intake camshaft may be changed to an advancing side.

In this way, when the relative rotation phase of the valve timing controller is changed after the internal combustion engine is stopped, a compression ratio is increased when starting the internal combustion engine, and a load applied to the starter motor is increased. Consequently, the increased load hinders the quick starting, and startability is degraded.

In addition, Reference 2 does not disclose a control mode of an electric actuator in order to set the opening/closing timing to the most retarding phase after the internal combustion engine is stopped. Accordingly, for example, it is conceivable that the electric actuator is driven for a set time or that the electric actuator is driven by a set amount (for example, a rotation speed). However, there is room for improvement in control accuracy.

A need thus exists for a valve timing controller which is not susceptible to the drawback mentioned above.

SUMMARY

A feature of a valve timing controller according to an aspect of this disclosure resides in that the valve timing controller includes a driving-side rotation member rotatable around a rotation axis and rotating in synchronization with a crankshaft of an internal combustion engine, a driven-side rotation member rotatable around the rotation axis and rotating integrally with a camshaft for opening and closing a valve of the internal combustion engine, a phase regulating mechanism that sets a relative rotation phase of the driving-side rotation member and the driven-side rotation member by a driving force of an electric motor, a detection unit that detects the relative rotation phase, a stop control portion that displaces the relative rotation phase by controlling the electric motor to stop the internal combustion engine after the relative rotation phase reaches a stop phase, and a correction control portion that displaces the relative rotation phase in a direction closer to the stop phase by controlling the electric motor, when the detection unit detects that the relative rotation phase is displaced beyond a set amount from the stop phase, in a state where the internal combustion engine is stopped by the stop control portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
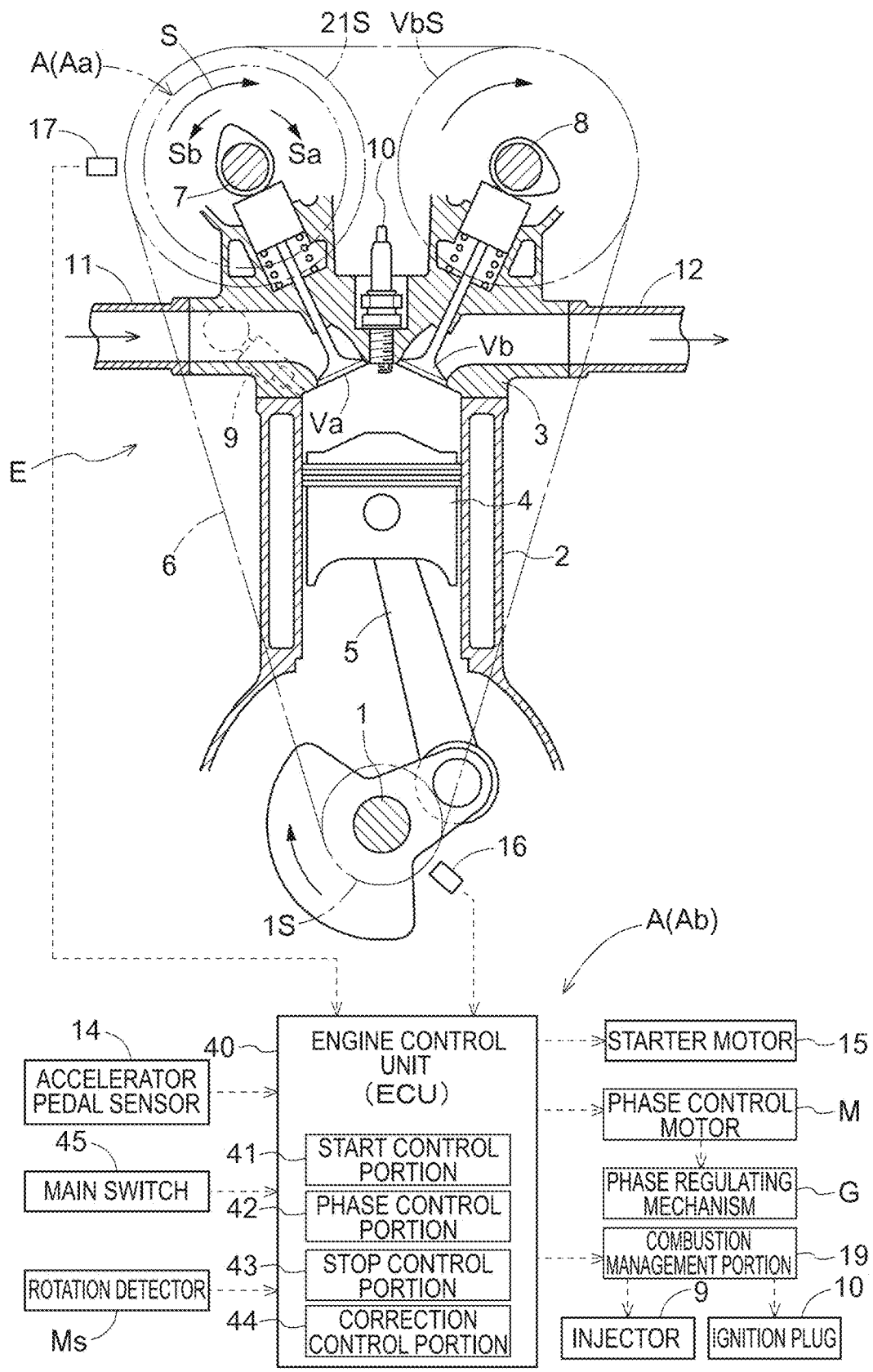
FIG. 1 is a view illustrating a cross section of an engine and a control device.

Hereinafter, embodiments disclosed here will be described with reference to the drawings.
Basic Configuration As illustrated in FIG. 1, an engine E serving as an internal combustion engine includes an intake valve Va and an exhaust valve Vb, and includes a valve timing controller A that sets a valve timing (opening/closing timing) of the intake valve Va. This engine E (example of the internal combustion engine) is provided in a vehicle in order to obtain a traveling driving force of a passenger car.

The engine E is controlled by an engine control unit 40, and the valve timing of the intake valve Va of the engine E is controlled by the valve timing controller A. In particular, the valve timing controller A is configured to include an operation body Aa including hardware for determining the valve timing of the intake valve Va by a driving force of a phase control motor M (example of an electric motor), and a control unit Ab including software of the above-described engine control unit 40 for controlling the phase control motor M.

Figure 2:
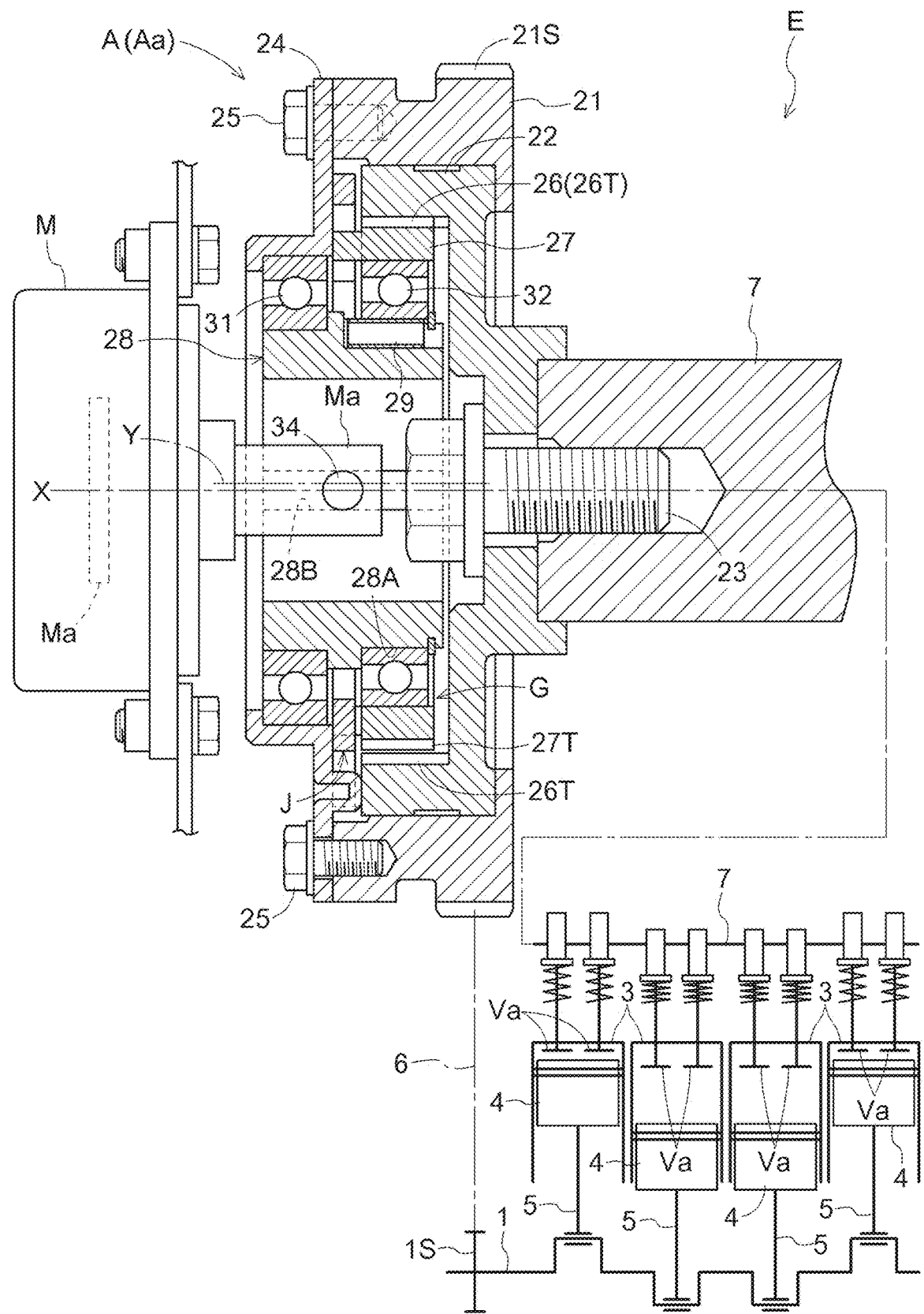
FIG. 2 is a cross-sectional view of a valve timing control mechanism.

As illustrated in FIG. 2, the operation body Aa of the valve timing controller A has a drive case 21 (driving-side rotation member) and an internal rotor 22 (driven-side rotation member), and has phase regulating mechanism G that changes a relative rotation phase between the drive case 21 and the internal rotor 22 (sometimes, simply referred to as a "relative rotation phase" in the following description) by a driving force of a phase control motor M (example of an electric motor). In addition, the control unit Ab includes software that controls a valve timing of the intake valve Va by controlling the phase control motor M, based on signals of a crank angle sensor 16 and a cam angle sensor 17 in the engine control unit 40.

The relative rotation phase between the drive case 21 and the internal rotor 22 is a relative angle around a rotation axis X between the drive case 21 and the internal rotor 22. In addition, the valve timing (opening/closing timing) of the intake valve Va is changed by changing the relative rotation phase.

As illustrated in FIG. 1, the engine E is configured to be a 4-cycle type as follows. A cylinder head 3 is connected to an upper portion of a cylinder block 2 that supports a crankshaft 1. A piston 4 is accommodated to be capable of reciprocating in a plurality of cylinder bores formed in the cylinder block 2. The piston 4 is connected to the crankshaft 1 by a connecting rod 5.

The cylinder head 3 includes the intake valve Va and the exhaust valve Vb, and an upper portion of the cylinder head 3 includes an intake camshaft 7 (example of a camshaft for opening and closing the valve) that controls the intake valve Va and an exhaust camshaft 8 that controls the exhaust valve Vb. In addition, a timing belt 6 is wound around an output pulley 1S of the crankshaft 1, a drive pulley 21S of the operation body Aa, and an exhaust pulley VbS of the exhaust valve Vb.

The cylinder head 3 includes an injector 9 for injecting a fuel into a combustion chamber, and an ignition plug 10. An intake manifold 11 that supplies air to the combustion chamber via the intake valve Va and an exhaust manifold 12 that feeds combustion gas from the combustion chamber via the exhaust valve Vb are connected to the cylinder head 3.

As illustrated in FIGS. 1 and 2, the engine E includes a starter motor 15 that drives the crankshaft 1 to rotate. The crank angle sensor 16 that can detect a rotation angle is provided at a position in the vicinity of the crankshaft 1. The cam angle sensor 17 that can detect a rotational angle of the intake camshaft 7 is provided in the vicinity of the intake camshaft 7.

The crank angle sensor 16 and the cam angle sensor 17 are configured to be a pickup type that intermittently outputs pulse signals in response to the rotation. The crank angle sensor 16 acquires a rotation angle from a rotation reference by counting the pulse signals from the rotation reference of the crankshaft 1 during the rotation of the crankshaft 1. Similarly, the cam angle sensor 17 acquires a rotation angle from the rotation reference by counting the pulse signals from the rotation reference of the intake camshaft 7 during the rotation of the intake camshaft 7.

The crank angle sensor 16 and the cam angle sensor 17 are configured in this way. Accordingly, for example, a count value of the crank angle sensor 16 and a count value of the cam angle sensor 17 are stored in a state where the drive case 21 and the internal rotor 22 are in a predetermined reference phase (for example, an intermediate phase). In this manner, a configuration is adopted so that the relative rotation phase can be acquired by comparing two types of the count values regardless of whether the relative rotation phase is displaced from a reference phase to the advancing side or the retarding side.

The engine control unit 40 is configured to serve as an ECU that controls the engine E, and includes a start control portion 41, a phase control portion 42, a stop control portion 43, and a correction control portion 44 as control units Ab. Details of the control of the engine control unit 40 will be described later.
Valve Timing Controller: Operation Body As illustrated in FIG. 2, in the operation body Aa, the drive case 21 (driving-side rotation member) and the internal rotor 22 (driven-side rotation member) are disposed coaxially with the rotation axis X of the intake camshaft 7. The operation body Aa includes the phase regulating mechanism G that sets the relative rotation phases by a driving force of the phase control motor M (example of the electric motor).

The drive pulley 21S is formed on an outer periphery of the drive case 21. The internal rotor 22 is enclosed by the drive case 21, and is connected and fixed to the intake camshaft 7 by a connecting bolt 23. According to this configuration, the internal rotor 22 is supported in a state of being connected to the intake camshaft 7, and the drive case 21 is supported to be relatively rotatable by an outer peripheral portion of the internal rotor 22.

The phase regulating mechanism G is disposed between the drive case 21 and the internal rotor 22, and a front plate 24 is fastened by a plurality of fastening bolts 25 at a position for covering an opening portion of the drive case 21. In this manner, displacement in a direction along the rotation axis X between the phase regulating mechanism G and the internal rotor 22 is regulated by the front plate 24.

As illustrated in FIG. 1, the operation body Aa is entirely rotated in a driving rotational direction S by a driving force transmitted from the timing belt 6. In addition, a driving force of the phase control motor M is transmitted to the internal rotor 22 via the phase regulating mechanism G. Accordingly, the relative rotation phase of the internal rotor 22 with respect to the drive case 21 is displaced. In the displacement, a displacement direction toward a direction the same as the driving rotational direction S will be referred to as an advancing direction Sa, and a direction opposite thereto will be referred to as a retarding direction Sb.

Valve Timing Controller: Phase Regulating Mechanism

As illustrated in FIG. 2, the phase regulating mechanism G includes a ring gear 26 formed coaxially with the rotation axis X on an inner periphery of the internal rotor 22, an inner gear 27 rotatably disposed coaxially with an eccentric axis Y on an inner peripheral side of the internal rotor 22, an eccentric cam body 28 disposed on an inner peripheral side of the inner gear 27, a front plate 24, and a joint portion J. The eccentric axis Y is formed in a posture parallel to the rotation axis X.

The ring gear 26 has a plurality of internal teeth portions 26T, and the inner gear 27 has a plurality of external teeth portions 27T. A portion of the external teeth portions 27T meshes with the internal teeth portion 26T of the ring gear 26. This phase regulating mechanism G is configured to serve as an inscribed planetary gear reducer in which the number of teeth of the external teeth portions 27T of the inner gear 27 is smaller than the number of teeth of the internal teeth portions 26T of the ring gear 26 by one tooth.

The joint portion J is configured to serve as an Oldham joint type in which the inner gear 27 and the drive case 21 are integrally rotated while maintaining a positional relationship of the inner gear 27 eccentric with respect to the drive case 21.

The eccentric cam body 28 has a tubular shape as a whole, and a pair of engagement grooves 28B is formed in a posture parallel to the rotation axis X with respect to the inner periphery. The eccentric cam body 28 is supported by a first bearing 31 with respect to the front plate 24 to rotate coaxially with the rotation axis X, and an eccentric cam surface 28A is formed on an outer periphery of a portion on the intake camshaft 7 side from a support position thereof.

The eccentric cam surface 28A is formed in a circular shape (circular cross-sectional shape) around the eccentric axis Y in a posture parallel to the rotation axis X. The inner gear 27 is supported to be rotatable with respect to the eccentric cam surface 28A via a second bearing 32. In addition, a configuration is adopted as follows. A spring body 29 is fitted into a recess portion formed on the eccentric cam surface 28A, and a biasing force of the spring body 29 is applied to the inner gear 27 via the second bearing 32. According to this configuration, a portion of the external teeth portion 27T of the inner gear 27 meshes with a portion of the internal teeth portion 26T of the ring gear 26, and a meshing state is maintained by the biasing force of the spring body 29.

In the phase control motor M, an engagement pin 34 supported by the engine E and formed in an output shaft Ma (example of the shaft of the phase control motor M) is fitted into the engagement groove 28B on the inner periphery of the eccentric cam body 28. Although details are not illustrated, the phase control motor M includes the rotor having the permanent magnet, the stator having a plurality of field coils disposed at positions surrounding the rotor, the output shaft Ma (shaft) to which the rotation of the rotor is transmitted, and a rotation detector Ms (example of the detection unit) having three hole elements for detecting magnetism of the permanent magnet of the rotor. In this manner, the phase control motor M is configured to serve as a brushless type having a structure common to that of a three-phase motor.

In the valve timing controller A, when the engine E is operated, the output shaft Ma is driven to rotate in the driving rotational direction S at a speed the same as that of the crankshaft 1, thereby maintaining the relative rotation phase of the valve timing controller A. In addition, when the relative rotation phase is displaced in the advancing direction Sa, the rotation speed of the output shaft Ma is controlled to be reduced, and when the relative rotation phase is displaced in the retarding direction Sb, the rotation speed of the output shaft Ma is controlled to be increased.

That is, in a situation where the engine E is stopped, in the phase regulating mechanism G, when the eccentric cam body 28 rotates around the rotation axis X in response to the rotation of the output shaft Ma by driving the phase control motor M, each time the inner gear 27 rotates once, the inner gear 27 and the ring gear 26 are relatively rotated by an angle corresponding to a difference in the number of the teeth. As a result, adjustment of the valve timing is realized by relatively rotating the drive case 21 rotating integrally with the inner gear 27 via the joint portion J and the intake camshaft 7 connected to the ring gear 26 by the connecting bolt 23.

Control Configuration

As illustrated in FIG. 1, in the engine control unit 40, a detection signal is input from the crank angle sensor 16 and the cam angle sensor 17, and a detection signal is input from the main switch 45, the accelerator pedal sensor 14, and the rotation detector Ms. In addition, the engine control unit 40 outputs a control signal to the starter motor 15, the phase control motor M, and a combustion management portion 19.

In this configuration, the main switch 45 is disposed in a panel portion of a driver's seat of the vehicle, and enables starting of the engine E by an artificial operation and complete stopping by the artificial operation. The accelerator pedal sensor 14 detects a stepping amount of an accelerator pedal (not illustrated). The combustion management portion 19 manages an operation of pumps that supply the fuel to the injector 9, and manages an ignition order or an ignition timing by controlling an ignition circuit for supplying electric power to the ignition plug 10.

As described above, the engine control unit 40 includes the start control portion 41, the phase control portion 42, the stop control portion 43, and the correction control portion 44. The control portions are configured to serve as software, but a portion of the respective control portions can be configured to serve as hardware.

The start control portion 41 starts the engine E in a stopped state. The phase control portion 42 sets the relative rotation phase between the drive case 21 and the internal rotor 22 in a situation where the engine E is basically operated. The stop control portion 43 automatically stops the engine E when a stop condition is satisfied, and completely stops the engine E, based on an artificial operation. The phase control portion 42 performs control to displace the relative rotation phase to a target phase when the engine E is stopped.

In particular, the stop control portion 43 performs control to automatically stop the engine E and performs control to stop the engine E by the artificial operation. When the engine E is stopped, the stop control portion 43 sets the relative rotation phase of the operation body Aa of the valve timing controller A to the stop phase. The correction control portion 44 performs control to return the relative rotation phase to the stop phase, when the relative rotation phase is changed from the stop phase after the engine E is automatically stopped.

Figure 3:
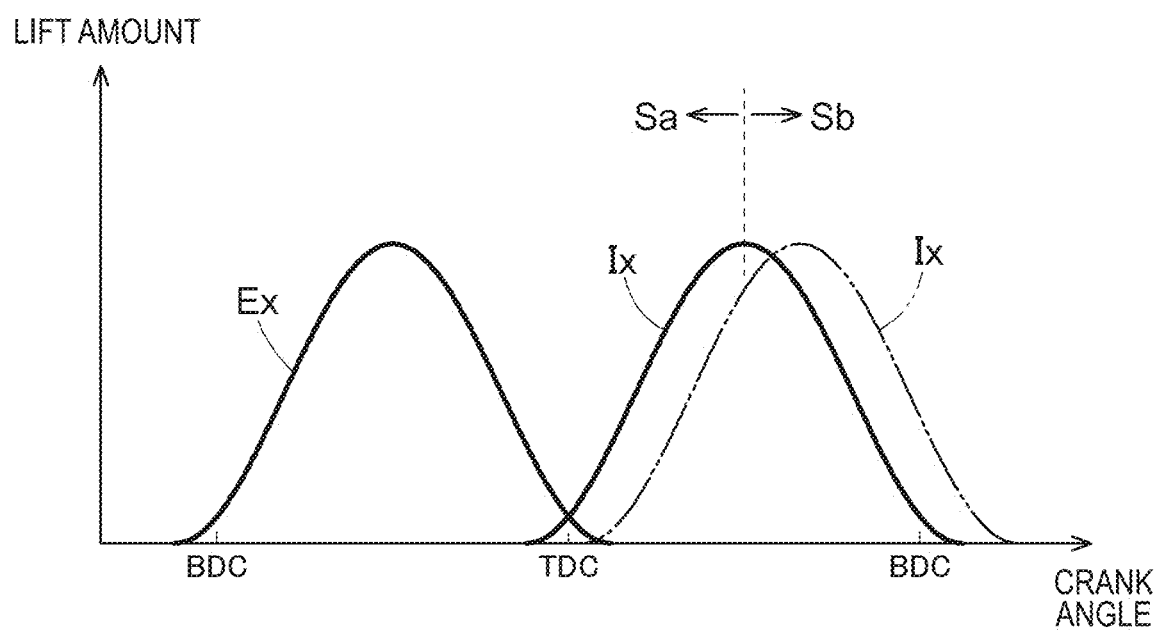
FIG. 3 is a view illustrating a valve timing between an intake valve and an exhaust valve.

FIG. 3 illustrates the valve timing (opening/closing timing) of the intake valve Va and the exhaust valve Vb. In the drawing, a crank angle of the crankshaft 1 is illustrated in a horizontal axis direction, and a lift amount of the intake valve Va and exhaust valve Vb is illustrated in a vertical axis direction. In addition, in FIG. 3, the valve timing when the intake valve Va is in an intermediate phase is illustrated by a solid line graph, and the valve timing when the intake valve Va is displaced to a most retarding phase is illustrated by a two-dot chain line graph. In the drawing, a timing at which the piston 4 is located at a bottom dead center is illustrated as BDC, and a timing at which the piston 4 is located at a top dead center is illustrated as TDC.

As illustrated in the drawing, the valve timing controller A can displace the relative rotation phase between the drive case 21 and the internal rotor 22 in the advancing direction Sa and the retarding direction Sb. When the relative rotation phase is displaced in the advancing direction Sa, the intake amount is increased by advancing an intake start timing in an intake stroke. When the relative rotation phase is displaced in the retarding direction Sb, the intake amount is reduced by retarding the intake start timing in the intake stroke.

The most retarding phase indicates a state where the drive case 21 and the internal rotor 22 are relatively displaced in the retarding direction Sb, and the drive case 21 and the internal rotor 22 reach a mechanical operation limit. However, in the present embodiment, the most retarding phase is a phase including the vicinity of the mechanical operation limit.

Control Mode

Control modes of the operation body Aa of the valve timing controller A by the engine control unit 40 are illustrated in flowcharts of FIGS. 4 to 7.

Figure 4:
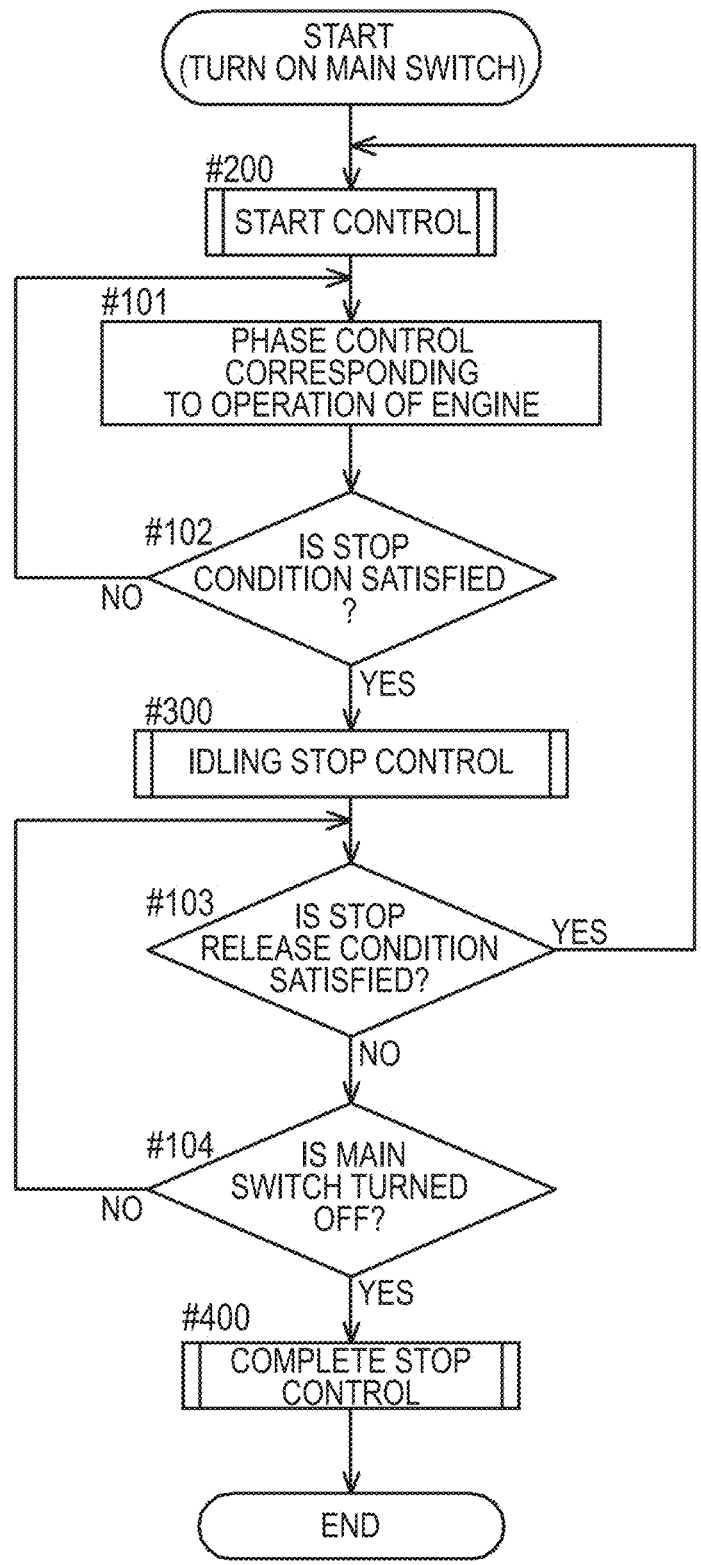
FIG. 4 is a flowchart illustrating a control mode of an engine control unit.

As illustrated in the flowchart of FIG. 4, when the main switch 45 is artificially turned on in a state where the engine E is stopped, the engine E is started by start control (Step #200). Next, the phase control portion 42 performs phase control of the valve timing controller A in response to a situation where the engine E is operated, and the phase control is performed until a stop condition of the engine E is satisfied (No in Steps #101 and #102).

Start control of Step #200 will be described later. In Step #101, the engine control unit 40 acquires information on a load applied to the engine E, a rotation speed of the engine E (rotation speed per unit time), and a stepping amount of the accelerator pedal. Based on the information, the phase control portion 42 sets an optimum relative rotation phase for operating the engine E to a target phase. After the target phase is set in this way, unless the stop condition of the engine E is satisfied in Step #102, the driving of the phase control motor M is controlled so that an actual relative rotation phase acquired based on the crank angle sensor 16 and the cam angle sensor 17 coincides with the target phase.

In addition, in Step #102, the stepped accelerator pedal is released, and a vehicle speed is lowered than a set value to satisfy the stop condition of the engine E. Based on a signal transmitted from the accelerator pedal sensor 14, it is determined that the stepped accelerator pedal is released. When it is determined that the vehicle speed is lowered than the set value, based on a signal of a vehicle speed sensor (not illustrated) (Yes in Step #102), idling stop control is performed (Step #300).

The idling stop control (Step #300) is control in which the stop control portion 43 automatically stops the engine E. In the automatic stop, the relative rotation phase is set to the most retarding phase illustrated by the two-dot chain line in FIG. 3. Thereafter, the control is performed to stop the engine E. The control mode of the idling stop control (Step #300) will be described later.

Next, in a situation where the engine E is stopped by the idling stop control, when a stop release condition is satisfied (Yes in Step #103), the engine E is started by start control in Step #200. In contrast, in a situation where the engine E is stopped by the idling stop control, when the main switch 45 is artificially turned off (Yes in Step #104) while the stop release condition is not satisfied (No in Step #103), the stop control portion 43 completely stops the engine E by complete stop control (Step #400).

In the control, the start control (Step #200), the idling stop control (Step #300), and the complete stop control (Step #400) are configured to include subroutines, and the control mode of each subroutine will be described below.

Start Control

Figure 5:
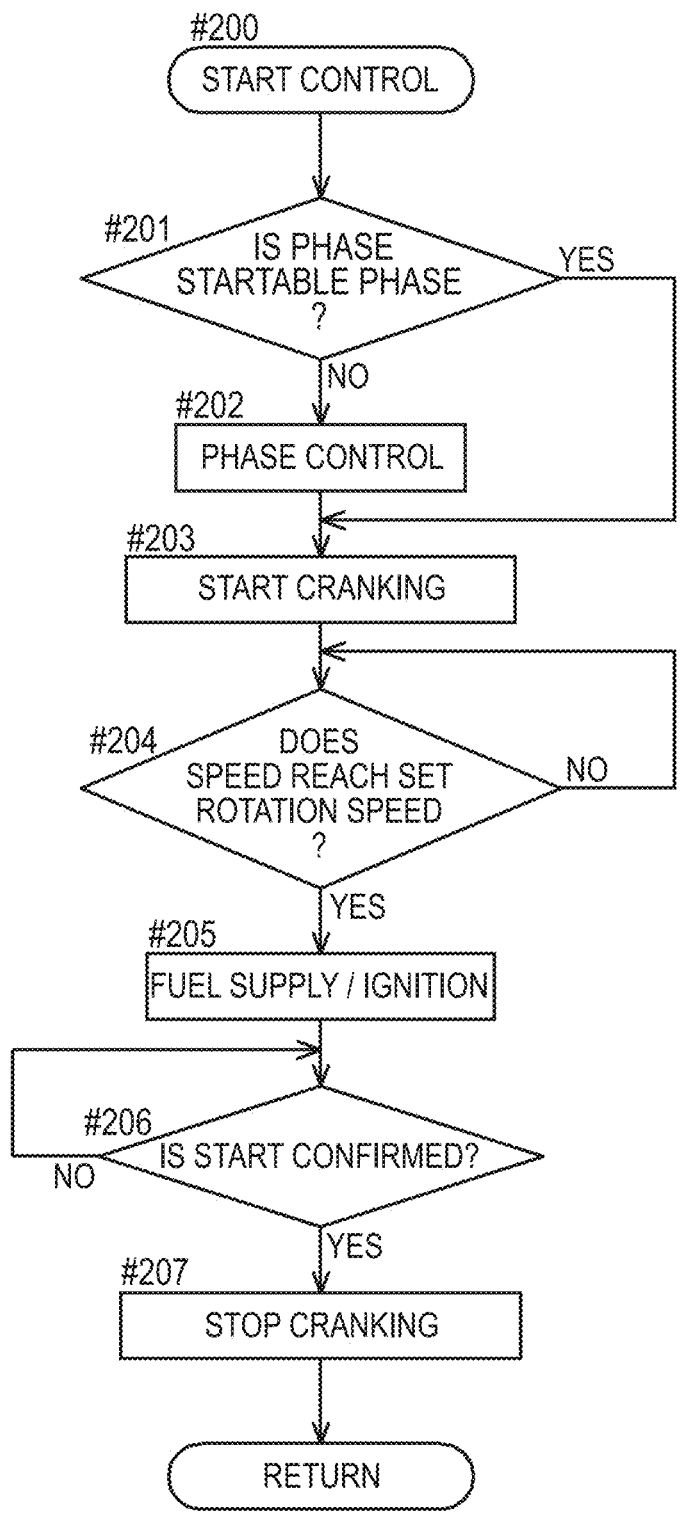
FIG. 5 is a flowchart of a start control.

As illustrated in the flowchart of FIG. 5, the start control (Step #200) determines whether or not the relative rotation phase of the operation body Aa of the valve timing controller A is in a startable phase. When it is determined that the phase is not the startable phase (No in Step #201), the relative rotation phase is displaced to the startable phase by the control of the phase control portion 42 (Step #202). Next, cranking is started by driving the starter motor 15, and the cranking is continued until the crankshaft 1 reaches a set rotation speed (Steps #203 and 204).

In the idling stop control (Step #300) illustrated in FIG. 4, the relative rotation phase of the operation body Aa of the valve timing controller A is set to the most retarding phase. Accordingly, when the engine E starts after it is determined that the stop release condition is satisfied as described above (Yes in Step #103), a load applied to the starter motor 15 is reduced during the cranking in Step #203. Therefore, the rotation speed of the crankshaft 1 can be raised within a short time.

In addition, in this case, it is desirable that the valve timing of the intake valve Va which is required for starting (igniting) the engine E by supplying the fuel is on the advancing side than the most retarding phase. Accordingly, in the start control (Step #200) in which the engine E starts after the idling stop control (Step #300), for example, the relative rotation phase of the operation body Aa of the valve timing controller A is controlled to be displaced toward the intermediate phase in Step #202 so that the engine E can be reliably started.

The valve timing of the intake valve Va which is required for starting the engine E is affected by a temperature of the engine E. Accordingly, for example, a target relative rotation phase may be set in Step #202, based on a detection result of a water temperature sensor.

In contrast, in the complete stop control (Step #400) illustrated in FIG. 4, the valve timing of the intake valve Va (for example, the most retarding phase) may be set so that the engine E can be started when the engine E is in a cold state. Therefore, in the start control (Step #200) after the complete stop control (Step #400), it is determined that the phase is startable phase in Step #201. As a result, the phase is not controlled in Step #202 of the start control.

Next, the injector 9 supplies the fuel to the combustion chamber by the control of the combustion management portion 19. The engine E is started by igniting the ignition plug 10 (Step #205). Thereafter, when the rotation speed of the crankshaft 1 exceeds a set value (Yes in Step #206), the start of the engine E is confirmed, the starter motor 15 is stopped, and the cranking is stopped (Step #207).

Idling Stop Control

Figure 6:
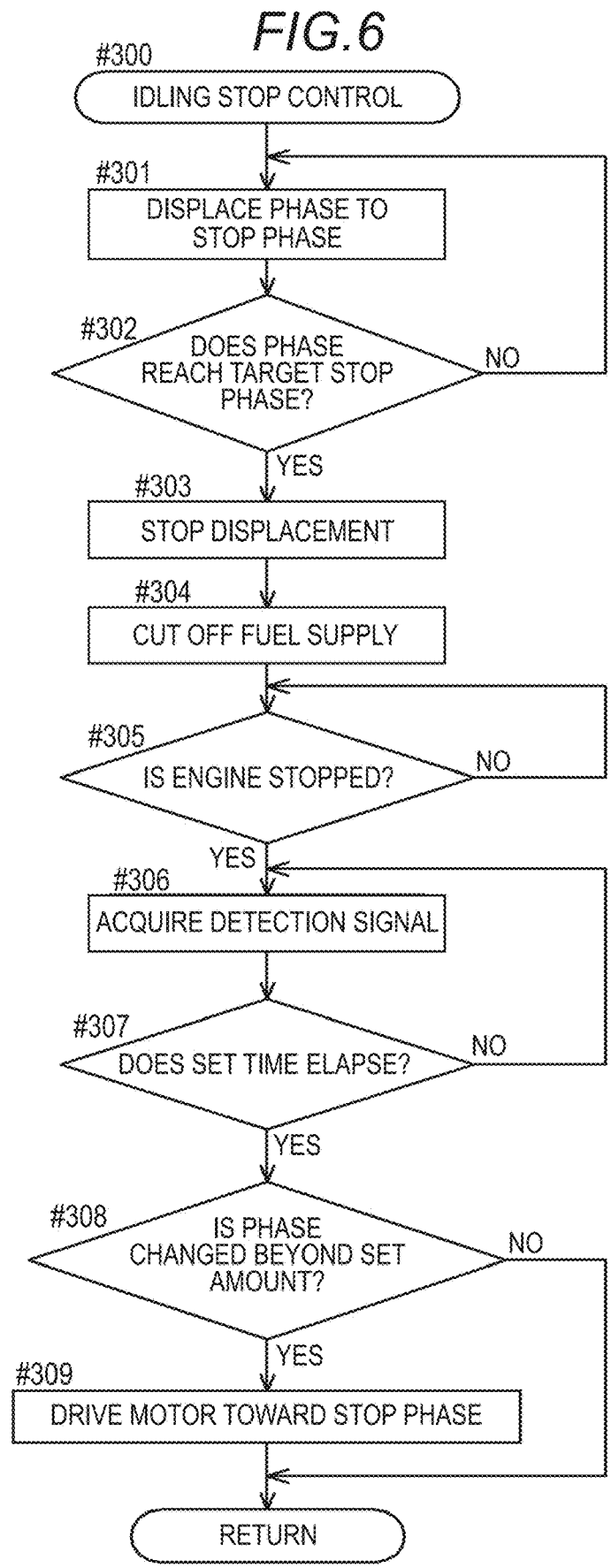
FIG. 6 is a flowchart of an idling stop control.

As illustrated in FIG. 6, in the idling stop control (Step #300), the most retarding phase (relative rotation phase for obtaining the valve timing illustrated by the two-dot chain line in FIG. 3) is set as the stop phase. The phase control portion 42 controls the phase control motor M to displace the relative rotation phase toward the stop phase (Step #301). Due to this displacement, when it is detected that the relative rotation phase has reached the stop phase (most retarding phase) (Yes in Step #302), the displacement is stopped and the fuel supply is cut off under the control of the combustion management portion 19 (Steps #301 to #304).

The phase control portion 42 controls the rotation speed of the phase control motor M so that the relative rotation phase between the drive case 21 and the internal rotor 22 is maintained at the stop phase, based on the detection signals of the crank angle sensor 16 and the cam angle sensor 17. Therefore, in the idling stop control, when the rotation speed of the crankshaft 1 is significantly reduced due to the fuel cut, the rotation speed of the phase control motor M is also reduced, and when the engine E is stopped, the phase control motor M is also stopped.

Next, after it is confirmed by a detection signal of the crank angle sensor 16 that the engine E is stopped (Yes in Step #305), the correction control portion 44 continuously acquires a signal of the rotation detector Ms of the phase control motor M until a set time (shorter time than a few seconds) elapses (Steps #306 and #307).

Based on the signal of the rotation detector Ms which is acquired in this way, until the set time elapses from the timing at which the engine E is stopped, when it is determined that the relative rotation phase is changed to the advancing side beyond a set amount with reference to the most retarding phase (Yes in Step #308), the correction control portion 44 controls the phase control motor M so that the relative rotation phase is displaced in a direction closer to the stop phase (returning direction). (Step #309).

In a case where it is determined in Step #308 that the relative rotation phase is not changed, and in a case where it is determined that the change amount of the relative rotation phase is smaller than the set amount (may include a case where the change amount of the relative rotation phase coincides with the set amount), the control of Step #309 is not performed.

In particular, the correction control portion 44 continuously acquires the signals from the rotation detector Ms for a set time immediately after the engine E is stopped. In this manner, the correction control portion 44 can acquire a rotation direction and a rotation amount (rotation angle) of the output shaft Ma when the output shaft Ma of the phase control motor M is rotated.

As described above, when it is determined in Step #308 that the output shaft Ma is rotated beyond the set amount, the rotation detector Ms highly accurately detects the rotation amount of the output shaft Ma. Accordingly, in Step #309, in response to the angle corresponding to the rotation amount detected in the output shaft Ma, the rotation detector Ms outputs a highly accurate control signal (three-phase signal) to reverse the output shaft Ma.

That is, in the operation body Aa of the valve timing controller A, the phase regulating mechanism G is configured to reduce a rotational driving force of the phase control motor M to displace the relative rotation phase. Accordingly, when the relative rotation phase is changed after the engine E is stopped, the phase regulating mechanism G can enlarge and detect an angle of change by using the rotation detector Ms. Therefore, accuracy in detecting the angle of the change can be improved, and highly accurate control can be performed.

In the control of step #308, it is also conceivable to perform feedback control for repeatedly performing the control until a signal detected by the rotation detector Ms shows that the relative rotation phase reaches the stop phase (most retarding phase). In particular, when the feedback control is performed in this way, it is conceivable that the relative rotation phase does not reach the stop phase serving as a control target due to an external force such as a pressure inside the cylinder which is applied to the intake camshaft 7. Accordingly, the control mode may be set to limit the number of times for performing the feedback control.

Since the control is performed, the relative rotation phase can be maintained in the most retarding phase when the idling stop control is completed.

Complete Stop Control

Figure 7:
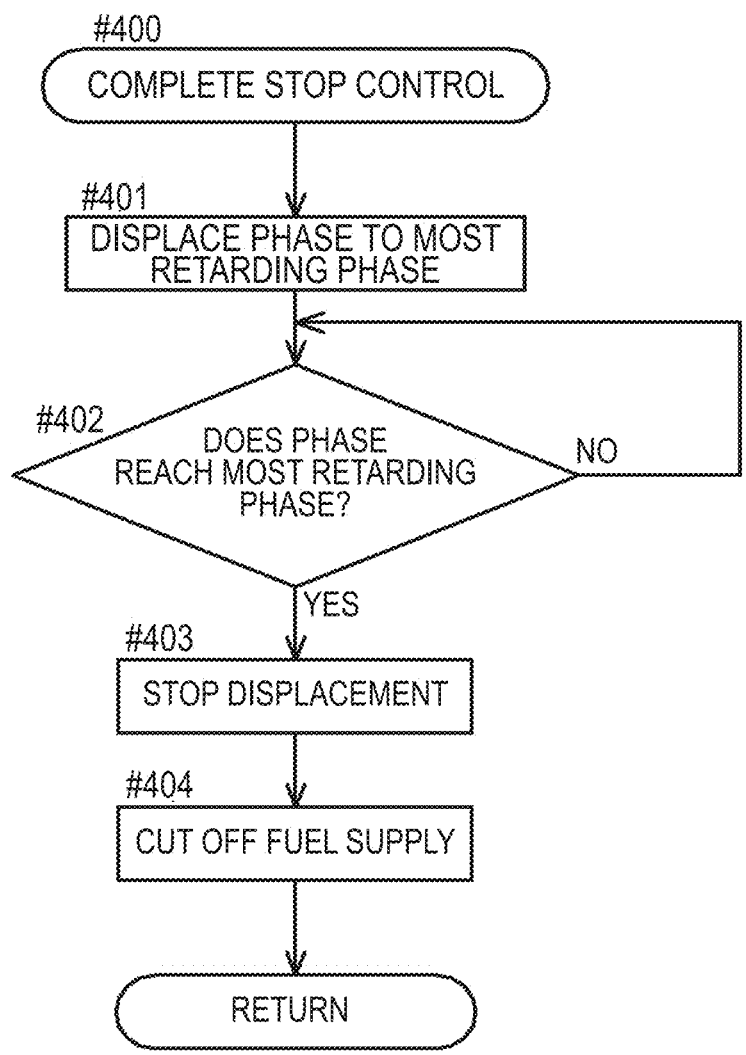
FIG. 7 is a flowchart of a complete stop control.

As illustrated in FIG. 7, in the complete stop control (Step #400), the most retarding phase is set as the stop phase, and the phase control portion 42 controls the relative rotation phase to be displaced toward the stop phase by the control of the phase control motor M (Step #401). When it is determined that the relative rotation phase reaches the stop phase (Yes in Step #402), the displacement is stopped, and fuel supply is cut off by the control of the combustion management portion 19 (Steps #401 to #404).

In the complete stop control, it is assumed that the control is performed to stop the engine E in a situation where the main switch 45 is turned off in order to completely stop the engine E after the vehicle is parked. For this reason, the relative rotation phase is set to an intermediate phase so that the engine E in a cold state can be satisfactorily started.

Operational Effect of Embodiment

According to this configuration, for example, when the vehicle stops traveling in an intersection at a red light, the stop control portion 43 automatically stops the engine E by performing the idling stop control. In the situation where the engine E is stopped, the relative rotation phase can be maintained in the most retarding phase.

In particular, after the engine E is stopped, a pressure is applied inside the cylinder, a rotational force is applied in a direction in which weights of a plurality of cylinders are balanced, or a biasing force of a valve spring that applies the biasing force in a closing direction of the intake valve Va is applied to a cam surface so that the rotational force is applied. For this reason, the opening/closing timing of the intake camshaft 7 may be changed to the advancing side. However, the correction control portion 44 can control the phase control motor M so that the change amount of the relative rotation phase from the most retarding phase is maintained within a range smaller than the set amount.

As described above, the phase regulating mechanism G has a structure that greatly reduces the rotation speed of the output shaft Ma of the phase control motor M. Therefore, when the relative rotation phase of the operation body Aa is changed in a state where the engine E is stopped, the phase regulating mechanism G rotates the rotor of the phase control motor M by the amount larger than the rotation amount (rotation angle) of the intake camshaft 7, and the rotation detector Ms detects the rotation amount. Since a detection mode is used in this way, a change in the relative rotation phase can be highly accurately detected. Even when the control for returning to the most retarding phase is performed, the feedback control based on the detection signal of the rotation detector Ms can be performed. Therefore, the highly accurate control is realized.

Furthermore, in a state where the engine E is stopped by performing the idling stop control, the relative rotation phase is maintained in the most retarding phase. Accordingly, thereafter, when the start control portion 41 automatically starts the engine E, the rotation speed of the crankshaft 1 becomes faster by using a low load within a short time, thereby enabling the quick starting.

Another Embodiment

Another embodiment disclosed here may be configured as follows in addition to the above-described embodiment (The reference numerals or signs common to those of the embodiment are assigned to those which have functions the same as those of the embodiment).

(a) As the detection unit, for example, a configuration may be adopted in which a potentiometer for detecting the relative rotation phase is provided inside the operation body Aa of the valve timing controller A so that a detection result of the potentiometer is acquired from the outside of the operation body Aa via non-contact type signal transmission means. It is also conceivable that the crank angle sensor 16 and the cam angle sensor 17 which have high resolution performance are used as the detection unit.

(b) When the engine E (internal combustion engine) is stopped, the intermediate phase is set as the stop phase of the operation body Aa of the valve timing controller A. As described in the complete stop control (Step #400) of the embodiment, the most retarding phase serving as the valve timing of the intake valve Va for starting the engine E in a cold state is an example of a specific preset phase. After the engine E is stopped, when the relative rotation phase deviates from the intermediate phase by being displaced with reference to the relative rotation phase at a timing at which the engine E is stopped, the correction control portion 44 may perform control so that the relative rotation phase returns to a specific intermediate phase.

When the stop phase is set to the intermediate phase in this way, there is a possibility that the relative rotation phase may be displaced in both the advancing direction Sa and the retarding direction Sb when the engine E is stopped. However, the correction control portion 44 can smoothly start the engine E in the cold state by performing the control so that the relative rotation phase returns to the intermediate phase. The stop phase does not need to be fixed to a determined value, and for example, may be set based on an external air temperature.

(c) The stop condition for automatically stopping the engine E (internal combustion engine) is not limited to a combination of an operation of the accelerator pedal and the vehicle speed, and may be a stepping operation of the brake pedal.

(d) The control for completely stopping the engine E is not limited to the control mode described in the complete stop control (Step #400). For example, the engine E may be stopped by performing the control, based on a special artificial operation in another control different from the idling stop control.

(e) The operation body Aa of the valve timing controller A may be provided in the exhaust camshaft 8 to set the valve timing of the exhaust camshaft 8. When the stop control portion 43 stops the engine E (internal combustion engine), the control mode of the stop control portion 43 may be set so that the relative rotation phase between the drive case 21 of the operation body Aa and the internal rotor 22 is displaced to any desired stop phase.

With regard to a configuration of the other embodiment (e), it is conceivable to adopt a configuration including the operation body Aa of the two valve timing controllers A to set each valve timing (opening/closing timing) of the intake camshaft 7 and the exhaust camshaft 8. In this configuration, when the stop control portion 43 stops the engine E (internal combustion engine), the valve timing controller A can be configured so that the relative rotation phases of the two operation bodies Aa are displaced to any desired different stop phases.

The embodiments disclosed here can be utilized for the valve timing controller.

A feature of a valve timing controller according to an aspect of this disclosure resides in that the valve timing controller includes a driving-side rotation member rotatable around a rotation axis and rotating in synchronization with a crankshaft of an internal combustion engine, a driven-side rotation member rotatable around the rotation axis and rotating integrally a camshaft for opening and closing a valve of the internal combustion engine, a phase regulating mechanism that sets a relative rotation phase of the driving-side rotation member and the driven-side rotation member by a driving force of an electric motor, a detection unit that detects the relative rotation phase, a stop control portion that displaces the relative rotation phase by controlling the electric motor to stop the internal combustion engine after the relative rotation phase reaches a stop phase, and a correction control portion that displaces the relative rotation phase in a direction closer to the stop phase by controlling the electric motor, when the detection unit detects that the relative rotation phase is displaced beyond a set amount from the stop phase, in a state where the internal combustion engine is stopped by the stop control portion.

According to this configuration, when the stop control portion stops the internal combustion engine, the relative rotation phase between the driving-side rotation member and the driven-side rotation member is displaced to the stop phase by controlling the electric motor. Therefore, the relative rotation phase is set to the stop phase when the internal combustion engine is stopped. In addition, after the internal combustion engine is stopped, a pressure is applied inside a cylinder of the internal combustion engine, or a rotational force is applied in a direction in which weights of a plurality of cylinders are balanced. For this reason, the relative rotation phase of the driving-side rotation member and the driven-side rotation member may be changed to an advancing side or a retarding side. When the detection unit detects a change in the relative rotation phase, the correction control portion controls the electric motor to displace the relative rotation phase in a direction closer to the stop phase.

Therefore, the valve timing controller is configured to be capable of highly accurately correcting the relative rotation phase to the stop phase, even when the relative rotation phase deviates from the stop phase after the internal combustion engine is stopped.

In addition to the above-described configuration, the electric motor may have a rotor having a permanent magnet, a stator having a field coil, a shaft to which rotation of the rotor is transmitted, and a rotation detector that detects a rotation position of the rotor by detecting magnetism of the permanent magnet, and may be configured to be a brushless type that controls a current supplied to the field coil, based on the rotation position of the rotor which is detected by the rotation detector. The phase regulating mechanism may be configured to displace the relative rotation phase by a force that reduces a rotation speed of the electric motor. The detection unit may detect the relative rotation phase, based on rotation of the shaft.

According to this configuration, the rotation detector provided in the electric motor is used as the detection unit. Therefore, it is not necessary to separately add another detection unit for detecting the relative rotation phase. In addition, the phase regulating mechanism is configured so that a rotational driving force of the electric motor is reduced to displace the relative rotation phase. Therefore, when the relative rotation phase is changed after the internal combustion engine is stopped, an angle of the change can be enlarged and detected by the rotation detector, and accuracy in detecting the angle of the change can be improved. As a result, even when a change amount of the relative rotation phase is small, the change amount can be highly accurately detected, and the relative rotation phase can be highly accurately close to the stop phase.

In addition to the above-described configuration, the internal combustion engine may be provided in a vehicle, and the camshaft may be an intake camshaft that opens and closes an intake valve. When a traveling speed of the vehicle is reduced to be slower than a predetermined speed by a driver's operation, the stop control portion may set the stop phase to a most retarding phase, and may control the internal combustion engine to be stopped after the relative rotation phase reaches the most retarding phase.

According to this configuration, for example, when the traveling speed is reduced to the speed slower than a predetermined speed by releasing a stepping operation of an accelerator pedal, the stop control portion sets the stop phase to the most retarding phase, and controls the internal combustion engine to be stopped. In this manner, when starting the internal combustion engine, the opening/closing timing of the intake valve is in the most retarding phase. Therefore, quick starting is realized by reducing a load applied to the starter motor during cranking.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve timing controller comprising:
    a driving-side rotation member rotatable around a rotation axis and rotating in synchronization with a crankshaft of an internal combustion engine;
    a driven-side rotation member rotatable around the rotation axis and rotating integrally with a camshaft for opening and closing a valve of the internal combustion engine;
    a phase regulating mechanism that sets a relative rotation phase of the driving-side rotation member and the driven-side rotation member by a driving force of an electric motor;
    a detection unit that detects the relative rotation phase;
    a stop control portion that displaces the relative rotation phase by controlling the electric motor to stop the internal combustion engine after the relative rotation phase reaches a stop phase; and
    a correction control portion that displaces the relative rotation phase in a direction closer to the stop phase by controlling the electric motor, when the detection unit detects that the relative rotation phase is displaced beyond a set amount from the stop phase, in a state where the internal combustion engine is stopped by the stop control portion.

2. The valve timing controller according to claim 1, wherein
    the electric motor has a rotor having a permanent magnet, a stator having a field coil, a shaft to which rotation of the rotor is transmitted, and a rotation detector that detects a rotation position of the rotor by detecting magnetism of the permanent magnet, and is configured to be a brushless type that controls a current supplied to the field coil, based on the rotation position of the rotor which is detected by the rotation detector,
    the phase regulating mechanism is configured to displace the relative rotation phase by a force that reduces a rotation speed of the electric motor, and
    the detection unit detects the relative rotation phase, based on rotation of the shaft.

3. The valve timing controller according to claim 1, wherein
    the internal combustion engine is provided in a vehicle, and the camshaft is an intake camshaft that opens and closes an intake valve, and
    when a traveling speed of the vehicle is reduced to be slower than a predetermined speed by a driver's operation, the stop control portion sets the stop phase to a most retarding phase, and controls the internal combustion engine to be stopped after the relative rotation phase reaches the most retarding phase.

* * * * *